United States Patent [19]

Bernuchon et al.

[11] Patent Number: 5,084,603
[45] Date of Patent: Jan. 28, 1992

[54] ARTICULATED PROTECTIVE SHIELD FOR A WELDING HEAD

[75] Inventors: Roland L. G. Bernuchon, Fontenay S/Bois; Jacques L. R. Riviere, Villemoisson S/Orge, both of France

[73] Assignee: Societe Nationale d'Etude et de Construction de Moteurs d'Aviation (S.N.E.C.M.), Paris, France

[21] Appl. No.: 683,050

[22] Filed: Apr. 10, 1991

[30] Foreign Application Priority Data

Apr. 12, 1990 [FR] France ............................. 90 04706

[51] Int. Cl.⁵ .............................................. B23K 9/16
[52] U.S. Cl. ............................................... 219/74
[58] Field of Search ................................ 219/74, 75

[56] References Cited

FOREIGN PATENT DOCUMENTS 1303317 4/1987 U.S.S.R. ............................. 219/74
1310145 5/1987 U.S.S.R. ............................. 219/74

Primary Examiner—Clifford C. Shaw
Attorney, Agent, or Firm—Bacon & Thomas

[57] ABSTRACT

A protective shield for a welding head is disclosed having an articulated construction to enable the shield to readily assume the contours of the parts to be welded or the contour of the weld bead. The shield is formed of shield members pivotally attached together and pivotally attached to the welding head. The protective shield also incorporates a locking device in each of the shield members that is activated by the pressurized protective gas directed onto the welded area. The pressurized gas urges pistons associated with each of the shield members against portions of an adjacent shield member to lock the members in their desired positions. The protective shield may be placed in its desired orientation by bringing it into contact with the parts to be welded such that the weight of the protective shield automatically causes it to assume the parts' contour. The application of the protective gas to the protective shield will automatically lock it in this position. Alternatively, the protective shield may be placed against a jig having the contour of the desired weld bead prior to the application of the protective gas. Once the gas has been applied to the shield, it will automatically be locked in the desired orientation.

10 Claims, 4 Drawing Sheets

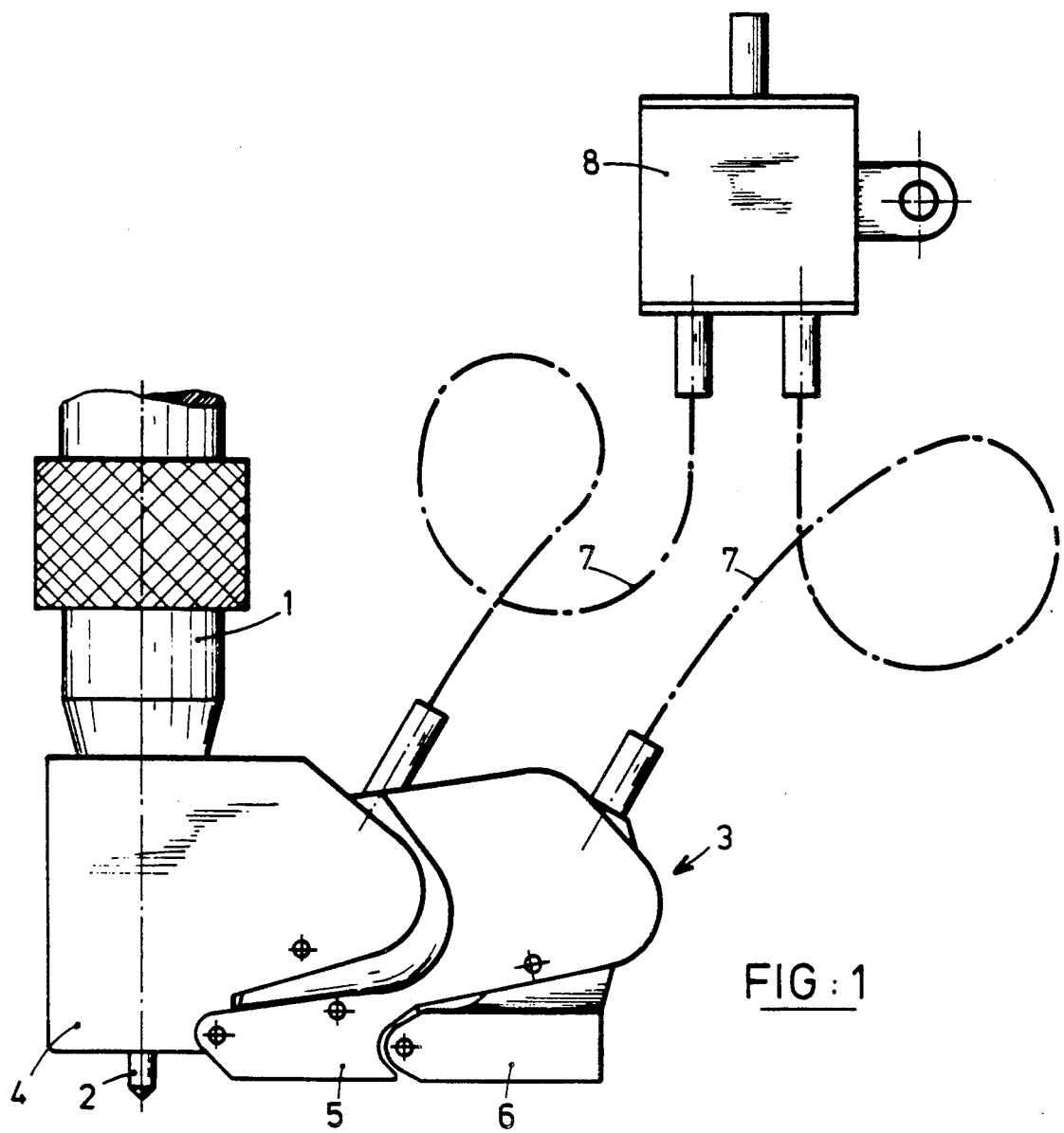
FIG : 1

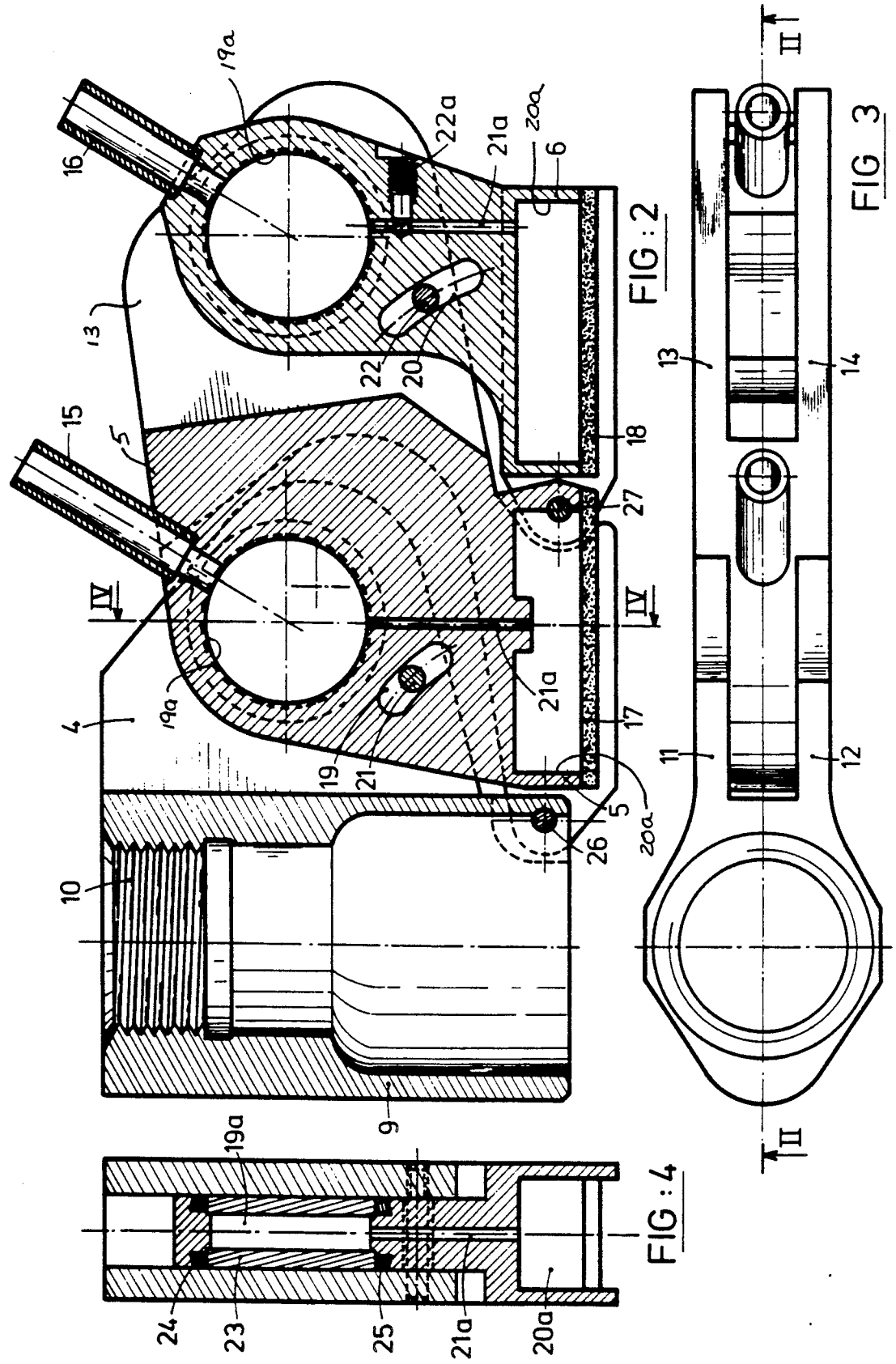

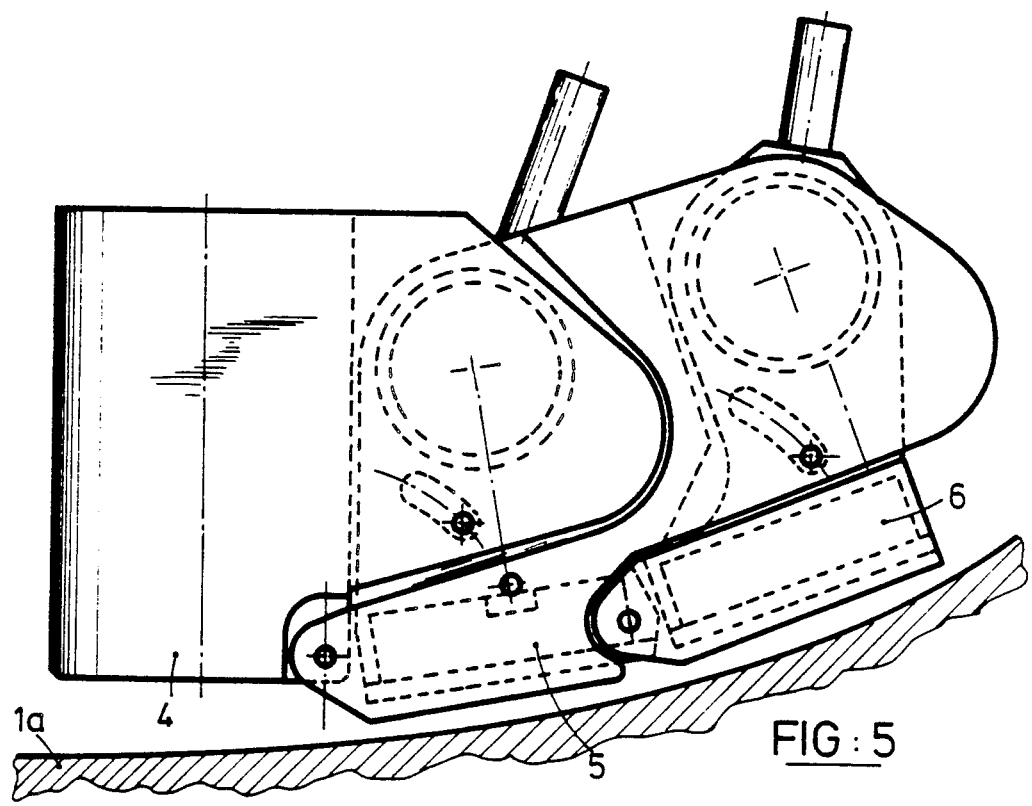
FIG: 5
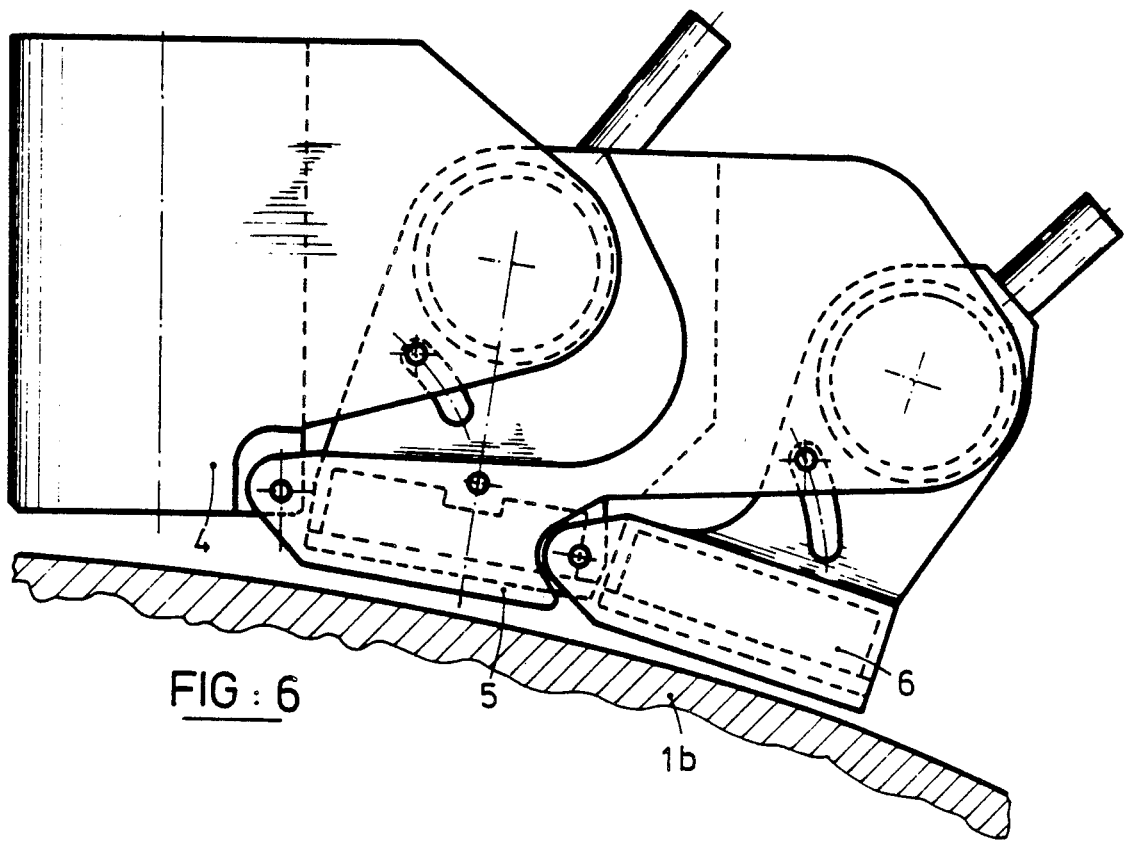
FIG: 6

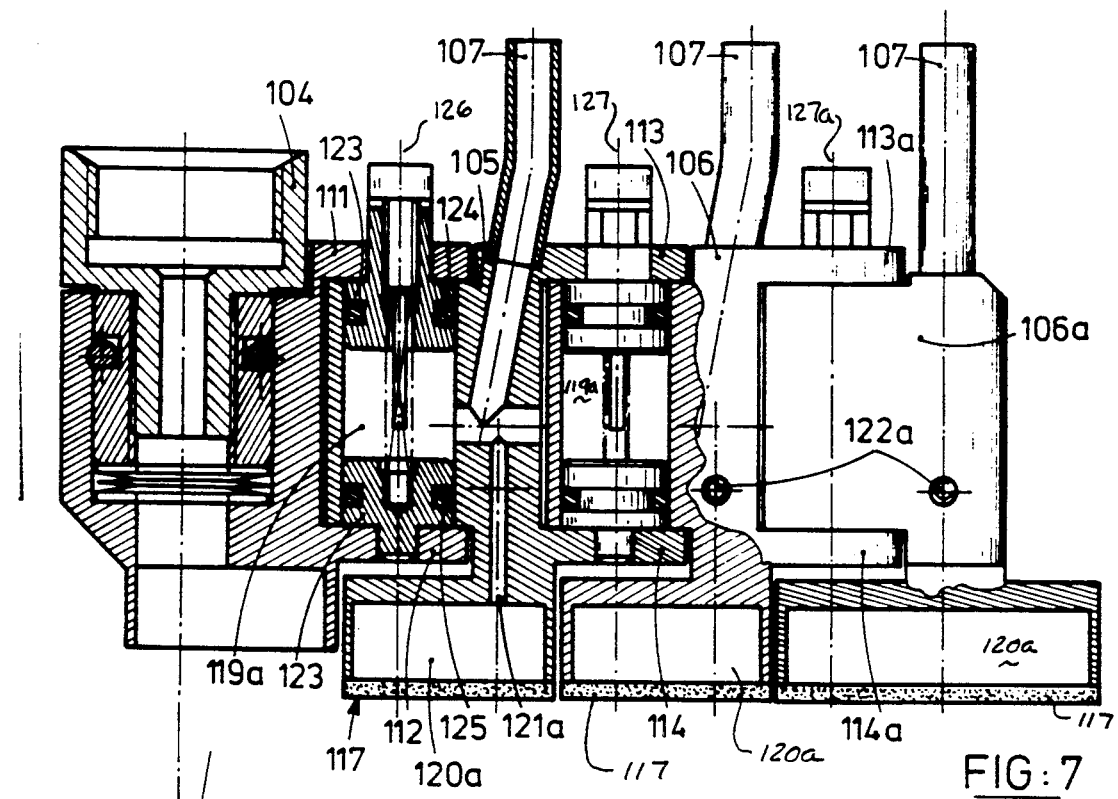
FIG: 7
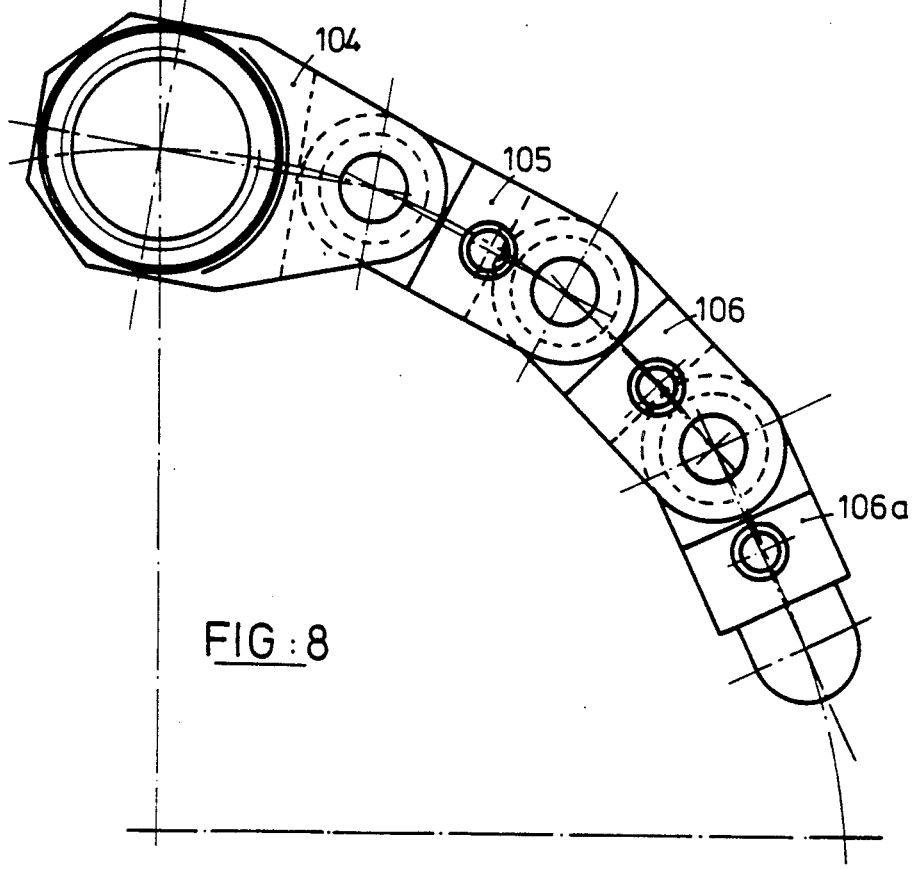
FIG: 8

ARTICULATED PROTECTIVE SHIELD FOR A WELDING HEAD

BACKGROUND OF THE INVENTION

The present invention relates to a protective shield for use with a gaseous-diffusion welding head wherein the shield may be readily shaped to conform to the contour of the welded parts, or to the contour of the desired weld bead. The invention also encompasses a method of utilizing such a protective shield.

In the welding of exotic metal parts, such as those made from titanium alloys or nickelbased super alloys used for aircraft engine parts, it is necessary to use such well-known welding techniques as TIG (tungsten inert gas), plasma arc or laser beam welding. When welding these metallic alloys, it is necessary to protect the molten metal in the welding zone and the weld bead from oxidation by the surrounding atmosphere. This is achieved by directing a protective gas over these areas, the gas being an inert gas such as argon or helium.

It is well known in the art to provide such a protective gas in the vicinity of the molten metal near the welding head by directing the gas through an annular collar attached to the welding head until the weld bead has sufficiently cooled. However, it is often also necessary to prevent the oxidation of the weld bead immediately downstream of the welding head until the weld bead has sufficiently cooled. Protective shields have been proposed to accomplish this which may be attached to the welding head and be supplied with the protective gas. The shields direct the protective gas onto the weld bead to prevent its oxidation during the cooling process. In order to effectively apply the protective gas to the weld bead area, it is necessary for the protective shield to closely match the contour or the geometry of the welded parts and/or welded bead, and it must travel along with the weld head during the welding process.

The thicker are the parts to be welded, the more sensitive the welded bead is to oxidation. This requires the length of the shield to be longer in order to provide the protection of the protective gas during cooling. In titanium based parts approximately 8 mm thick, the shield may typically exceed 150 mm.

The known protective shields typically have a fixed configuration, thereby rendering them usable only with a part having a similar configuration. Each part having a different contour requires a different fixed protective shield.

Protective shields are known which may be capable of being shaped by hand, but these are difficult to form in the exact shape of the parts being welded.

Also, it has proven exceedingly difficult to utilize the known devices with fully automatic welding machines, such as robots, without limiting the capabilities of such devices.

SUMMARY OF THE INVENTION

A protective shield for a welding head is disclosed having an articulated construction to enable the shield to readily assume the contours of the parts to be welded or the contour of the weld bead. The shield is formed from a plurality of shield members pivotally attached together and pivotally attached to the welding head.

The protective shield also incorporates a locking device in each of the shield members that is activated by the pressurized protective gas directed onto the welded area. The pressurized gas urges pistons, associated with each of the shield members, against portions of an adjacent shield member to lock the shield members in their desired positions.

The protective shield may be placed in its desired orientation by bringing it into contact with the parts to be welded such that the weight of the protective shield automatically causes it to assume the parts' contour. The application of the protective gas to the protective shield will automatically lock it in this position. Alternatively, the protective shield may be placed against a jig having the contour of the desired weld bead prior to the application of the protective gas. Once the gas has been applied to the shield, it will automatically be locked in the desired orientation.

BRIEF DESCRIPTION OF THE DRAWINGS

FIG. 1 is a side elevational view of a first embodiment of the protective shield according to the present invention.

FIG. 2 is a longitudinal cross-sectional view of the protective shield taken along line II—II in FIG. 3.

FIG. 3 is a top view of the protective shield illustrated in FIG. 1.

FIG. 4 is a lateral cross-sectional view taken along lines IV—IV in FIG. 2.

FIG. 5 is a side view of the protective shield arranged in a first orientation to weld concave parts.

FIG. 6 is a view similar to FIG. 5 with the protective shield configured to weld convex parts.

FIG. 7 is a side view, partially broken away, of a second embodiment of the protective shield according to the present invention.

FIG. 8 is a top view of the protective shield shown in FIG. 7 configured to weld a circular weld bead.

DETAILED DESCRIPTION OF THE PREFERRED EMBODIMENTS

FIG. 1 illustrates a welding head 1 which may be mounted on an automatic welding machine, or a welding robot (not shown). The welding head 1 illustrated in FIG. 1 illustrates an electrode 2 of a TIG welding head, but it is to be understood that the protective shield device may also be associated with a laser-type or a plasma welder.

The articulated protective shield 3 for gaseous diffusion welding is attached to the welding head 1 by an attachment member 4. The protective shield has a plurality of shield members. Although two such shield members, 5 and 6 are shown, it is to be understood that more or less may be utilized. The shield members 5 and 6 are pivotally connected to each other and are also pivotally connected to the attachment member 4. Each of the shield members are connected to feed lines 7 from a protective gas supply, schematically illustrated at 8. When the device is utilized to weld parts made from titanium alloys or nickel-based super alloys, the protective gas is inert and may be argon. A single gas source may be used to supply the protective gas to the shield members 5 and 6, as well as to the welding head 1.

As best illustrated in FIGS. 2–4, the attachment member 4 may comprise a generally cylindrical nozzle portion 9 attached to the welding head 1 by threads 10. The nozzle portion 9 is generally annular in configuration and, in known fashion, defines a nozzle to supply the inert gas around the welding electrode 2. A similar nozzle arrangement may also be used in a laserbeam or plasma welding devices.

Wing members 11 and 12 are fixedly attached to, and extend from the nozzle portion 9 generally parallel to each other as illustrated in FIG. 3. The shield member 5 is pivotally attached to the nozzle portion 9 by a pivot pin 26 such that the shield member 5 may pivot with respect to the nozzle portion 9 along the longitudinal axis of the pivot pin 26.

Wing members 13 and 14 are fixedly attached to the shield member 5 and extend rearwardly therefrom in generally parallel directions. The shield member 6 is pivotally attached to the shield member 5 by a pivot pin 27, such that the these members are relatively pivotable about the longitudinal axis of the pivot pin 27.

The shield member 5 defines an arcuate elongated slot 19 which slidably accepts pins 21 therein. Pin 21 extends between the wing members 11 and 12 and serves to limit the pivoting movement of the shield member 5. Similarly, shield member 6 defines elongated, arcuate slot 20 which slidably accepts pin 22 extending between wing members 13 and 14. Pin 22 and slot 20 limit the pivoting movement of shield member 6 with respect to shield member 5.

Tubes 15 and 16 are associated with shield members 5 and 6, respectively, and communicate with the feed lines 7 to direct the protective, inert gas into the shield members. The gas is directed into a first chamber 19a, through a passageway 21a and into a second chamber 20a. From chamber 20a, the gas passes through end plates 17 and 18, which are made of a porous material to insure uniform gas diffusion over the length of the weld bead. A threaded metering needle 22a may be associated with the shield members in order to control the flow of the protective gas through passage 21a.

The first chambers 19a are bounded on either lateral side by a pair of pistons 23. These pistons may be generally circular in configuration and have O-ring seals 24 and 25 to prevent the leakage of the protective gas from chamber 19a. The pistons are located so as to normally slidably bear against the inner surfaces of the wing members 11, 12, 13 or 14. When the protective gas, under pressure, is admitted to chambers 19a, the pressure in these chambers urges the pistons 23 outwardly against the inner surfaces of the wing members 11, 12, 13 or 14. This contact locks the shield members 5 and 6, and prevents them from pivoting about their respective pivot pins 26 and 27.

The method of utilizing the protective shield according to the present invention is illustrated in FIGS. 5 and 6. The welding head is positioned such that the shield members 5 and 6 come into contact with the parts to be welded and, due to their own weight, assume the contour of the parts. In FIG. 5, the shield will assume the convex shape of the part 1a, while in FIG. 6, the shield assumes the general contour of the convex part 1b. Since the shield members are freely pivotably, the force of gravity will enable them to assume the desired contours.

Once the shield members have assumed the desired configuration, the application of the pressurized, protective gas to the shield members will urge pistons 23 into contact with the adjacent wing members, thereby locking the shield members in the desired configuration. The welding head, along with the protective shield, may then be withdrawn from contact with the parts and positioned to carry out the welding process. During the welding process, the weld bead is protected against oxidation by the protective has emanating from the bottom of the protective shield 3. The variable geometry of the shield 3 enables it to be adapted to any specific contour, thereby enabling the shield according to the present invention to be utilized with various shaped parts. In the embodiment of the invention illustrated in FIGS. 1–6, parts having a radius of 400 mm or larger can be welded utilizing this protective shield.

This embodiment is especially well suited for the welding of generally circular parts. However, it is often necessary to make a generally arcuate or circular weld in a generally horizontal plane. The principles of this invention may be accommodated to this specific need by the embodiment illustrated in FIGS. 7 and 8.

The shield member is attached to the welding head (not shown) via welding nozzle 104 and, in this particular instance, comprises three shield members, 105, 106 and 106a. Tubes 107 connect each of the shield members to a source of pressurized, protective gas, as in the previous embodiment. The protective gas enters a first chamber 119a, a passageway 121a and a second chamber 120a in each shield member. From chamber 120a, it passes through a porous plate member 117 to insure the diffusion of the gas along with weld bead area. As in the previous embodiment, a metering needle 122a may be associated with each of the shield members to control the flow of gas through the associated passageway 121a.

Pistons 123 are located in chamber 119a and are acted upon by the pressurized, protective gas to lock the shield members 105, 106 and 106a in position to prevent their respective movement.

As illustrated in FIG. 7, shield member 105 pivots about axis 126 with respect to the nozzle 104; shield member 106 pivots about axis 127 with respect to the shield member 105; and shield member 106a pivots about axis 127a with respect to the shield member 106. These pivot axes are defined by the pistons 123 which have portions extending through corresponding wings 111, 112; 113, 114; and 113a, 114a. Again, seals 124 and 125 may be placed around the pistons 123 to prevent the leakage of gas past the pistons. A spring member may be interposed between opposite pistons 123 to retain them in position in the absence of a pressurized gas. The strength of such a spring should not be sufficient to prevent relative pivoting movement between the shield members.

The second embodiment operates similarly to the embodiment previously described. The welding head, with the protective shield attached may be brought into contact with a jig having the configuration of the desired weld contour, such contact being sufficient to form the shield in the desired contour. As illustrated in FIG. 8, the shield may be configured to follows a generally arcuate or circular weld. It has been found that a radius of approximately 150 mm can be achieved by this invention. Once the pressurized, protective gas is supplied to the shield members, it urges the pistons 123 outwardly against the respective wing members to thereby lock the shield members in their desired positions. Once the shield members are locked, the welding head may be positioned to perform the welding process in the normal fashion. The protective gas emanating from the lower portion of the shield member will protect the weld bead from oxidation as it cools. As in the previous embodiment, this embodiment may be configured in different ways to provide a variety of uses.

The foregoing description is provided for illustrative purposes only and should be construed as in any way limiting this invention, the scope of which is defined solely by the appended claims.

We claim:

1. A protective shield for directing a protective gas onto a welded area to prevent contamination of the weld for use with a gaseous diffusion welding head comprising:
   a) at least first and second shield members, each shield member defining gas chamber means;
   b) first means for pivotally attaching the first shield member to the welding head such that it may pivot about a first pivot axis;
   c) second means for pivotally attaching the second shield member to the first shield member such that it may pivot about a second pivot axis;
   d) means to supply the protective gas under pressure to the chamber means of the shield members; and,
   e) locking means operatively associated with each shield member and having at least one fluid pressure actuated piston located in the gas chamber means and actuated by the pressurized protective gas into contact with an adjacent one of the shield member and the welding head to lock the shield members in desired positions thereby preventing them from pivoting about their respective pivot axes.

2. The protective shield of claim 1 wherein the means for pivotally attaching the first shield member to the welding head comprises:
   a) a nozzle member attached to the welding head; and,
   b) pivot means to pivotally attach the first shield member to the nozzle member.

3. The protective shield of claim 2 wherein the means to supply the protective gas to the shield members also supplies protective gas to the nozzle member.

4. The protective shield of claim 2 wherein the locking means comprises:
   a) wing members fixedly attached to the nozzle member and at least the first shield member, each wing member extending adjacent to an adjacent shield member; and,
   b) piston means located on each shield member and operatively associated with the chamber means such that the pressurized protective gas in the chamber means urges the piston means into contact with a wing member.

5. The protective shield of claim 1 wherein the chamber means comprises:
   a) a first chamber defined by a shield member;
   b) a second chamber defined by a shield member; and,
   c) a passageway communicating with the first and second chambers to allow the protective gas to flow from the first to the second chambers.

6. The protective shield of claim 5 further comprising metering means operatively associated with the shield member to control the flow of the protective gas through the passageway.

7. The protective shield of claim 1 wherein the first and second pivot axes extend generally parallel to each other.

8. A method of operating a gaseous diffusion welding device having a welding head with a plurality of relatively pivotable shield members attached thereto to direct a protective gas onto a welded area comprising the steps of:
   a) positioning the plurality of shield members so as to match the contour of the desired weld joint;
   b) locking the plurality of shield members in their desired positions by activating a locking device having at least one fluid pressure actuated piston actuated by the protective gas into contact with an adjacent one of the shield member and the welding head; and,
   c) positioning the welding head relative to the parts to be welded to carry out the welding process.

9. The method of claim 8 wherein the plurality of shield members are positioned by bringing them into contact with parts to be welded so that they conform to the contour of the parts.

10. The method of claim 8 wherein the plurality of shield members are positioned by bringing them into contact with a jig having the contour of the desired weld bead.

* * * * *